July 9, 1929.  E. J. TJERNLUND  1,720,305
SHEARS
Filed Aug. 5, 1926    2 Sheets-Sheet 1
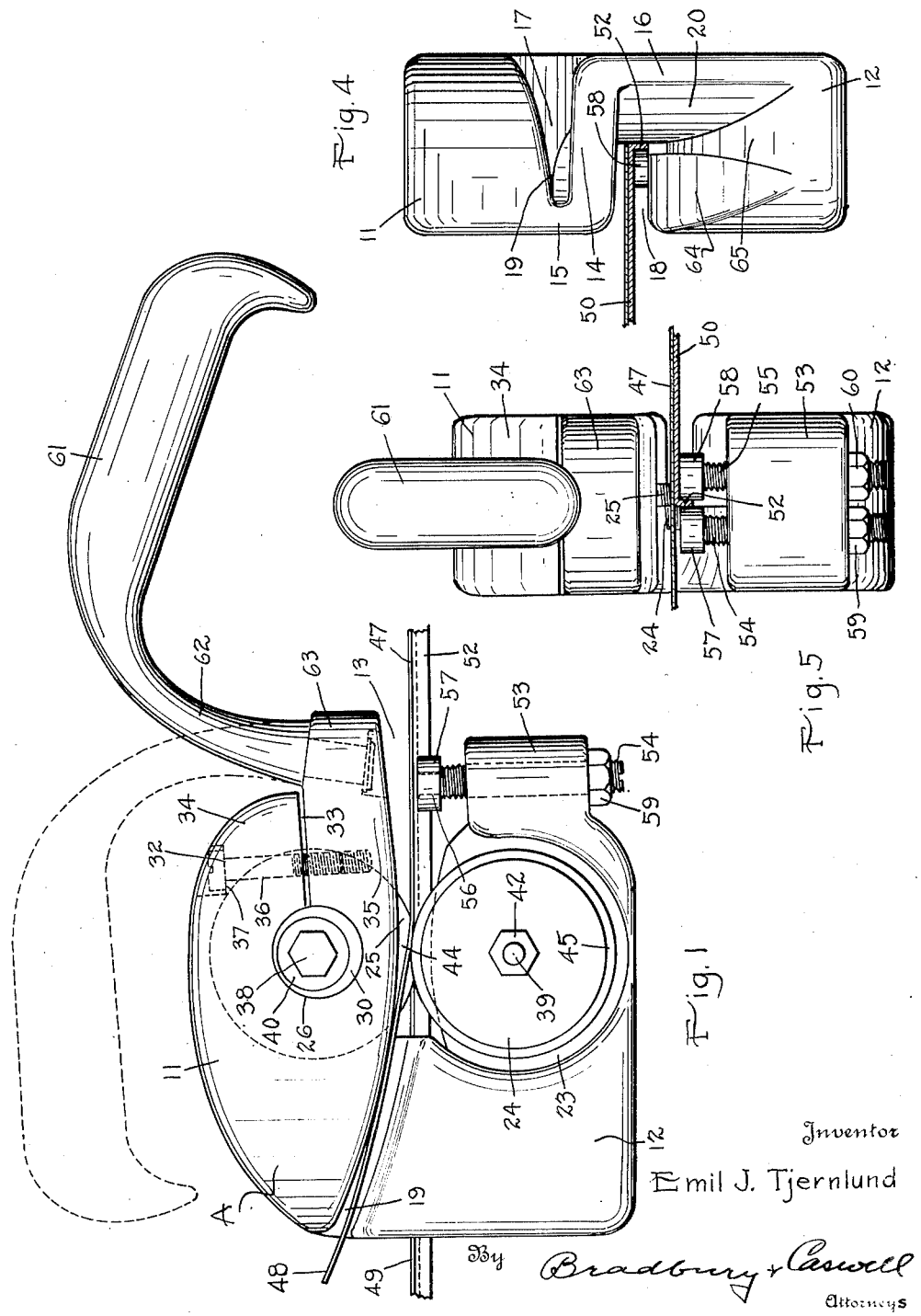
Inventor
Emil J. Tjernlund
By Bradbury + Caswell
Attorneys July 9, 1929.  E. J. TJERNLUND  1,720,305
SHEARS
Filed Aug. 5, 1926   2 Sheets-Sheet 2
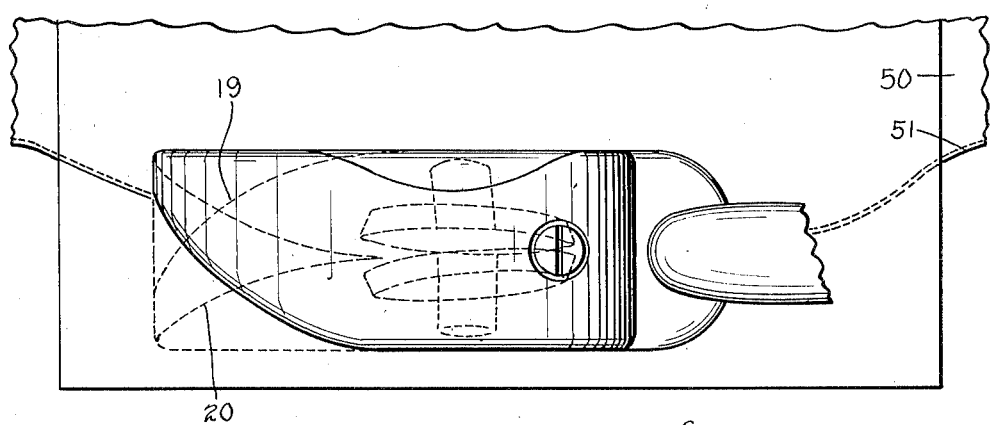
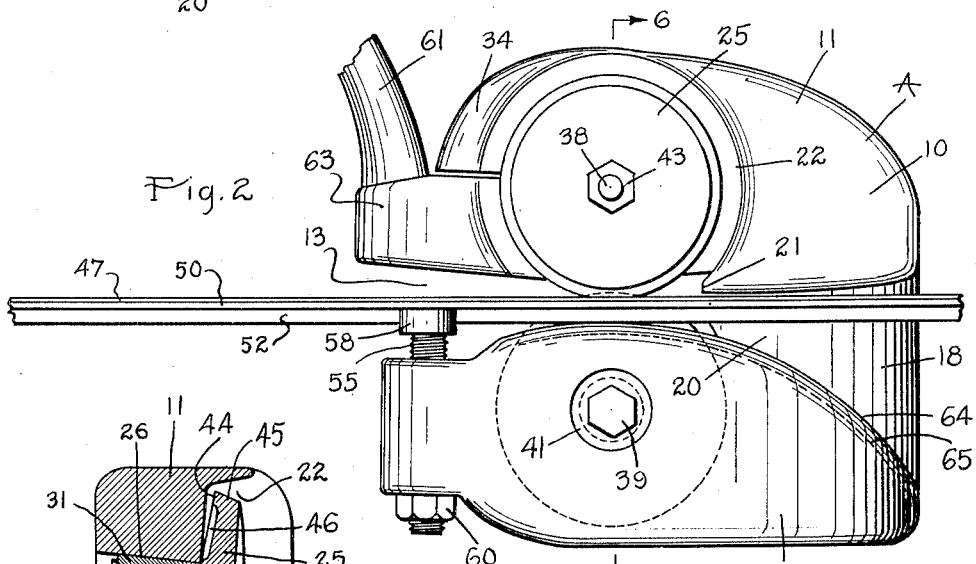
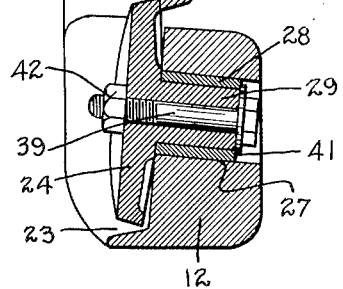
Inventor
Emil J. Tjernlund
By Bradbury + Caswell
Attorneys Patented July 9, 1929.

1,720,305

UNITED STATES PATENT OFFICE.

EMIL J. TJERNLUND, OF ST. PAUL, MINNESOTA, ASSIGNOR, BY DIRECT AND MESNE ASSIGNMENTS, TO J. J. BURGESS, OF ROCK ISLAND, ILLINOIS.

SHEARS.

Application filed August 5, 1926. Serial No. 127,285.

My invention relates to shears adapted to be used particularly in tin shops for cutting sheet metal and similar substances and has for its object to produce a portable shear adapted to be used for cutting curves in sheet metal in a simple and expedient manner.

Another object of the invention resides in providing a pattern adapted to have a sheet attached to the surface thereof, to be used in conjunction with the shear, which pattern is formed with a flanged edge serving to guide the shearing in its cutting action along the curved edge thereof and to cut the sheet in conformity therewith.

A still further object of the invention resides in forming said shear with a body having upper and lower supporting members and arranged in spaced relation to one another to form a transversely disposed groove for the reception of the pattern and the sheet attached thereto, said supporting members being connected together by means of a bridge having offset portions forming in conjunction with said upper and lower supporting members, oppositely disposed recesses extending in overlapping position to receive the severed portions of the sheet and to separate the same so as to enable the shear to follow the curves of the pattern.

Another object of the invention resides in forming said recesses curved to allow the severed portions of the sheet to pass readily through the same as the shear passes along the curved surface, and to form one of said recesses diverging away from the cutters to permit the shear to be used on curved surfaces, such as pipes and the like as well as on plane surfaces.

A still further object of the invention resides in providing the shear with a pair of complemental co-operating disk cutters each constructed with a conical surface and an intersecting tapered surface, said cutters being journalled with their axes in inclined relation to said body to bring the marginal portions of said conical surfaces of said cutters in overlapping contact, said cutters being arranged with the axes lying in intersecting planes to bring the point of contact at the intersection of the circles formed by the meeting of the surfaces of said cutters.

An object of the invention resides in forming the cutters with trunnions journalled in bushings secured within said supporting members, one of said bushings being eccentric to permit of the relative adjustment of the cutters to one another.

A feature of the invention resides in recessing a portion of the conical surfaces of said cutters to leave peripheral bands at the cutting edge of the same.

A still further object of the invention resides in providing a guide on said body co-operating with the flange of said pattern, which guide consists of a pair of threaded spindles screwed into said body and formed with eccentrically disposed trunnions at the upper portions of the same, having guide rollers journalled thereon, said spindles being rotatable to regulate the distance between said guide rollers and to vary the location of the same longitudinally.

A feature of the invention resides in providing a handle having a shank pivoted to the body portion in inclined relation thereto so as to permit the handle to be extended outwardly beyond the shear to allow the user to draw the same or to permit said handle to be turned back over the shear so as to permit the user to push the shear instead of drawing the same.

With the foregoing and other objects in view, which will appear in the following description, the invention resides in the novel combination and arrangement of parts and in the details of construction hereinafter described and claimed.

In constructing elbows and other special pipe work requiring curved cuts the usual practice has been to lay out the same upon the sheet and then make the cut by means of a pair of hand snips, or to cut the same with a shear having a curved blade designed for that purpose particularly. The former method is both inaccurate and slow, while the second method involves considerable expense in the formation of the cutters employed therewith, due to the fact that each cutter may be used but for a single elbow or other pipe section and but a single piece can be cut at one time. My invention overcomes these disadvantages by providing a shear adapted to be used in conjunction with a pattern having a flanged edge, such pattern being readily constructed in the ordinary tin shop from available materials and by machines usually had for that purpose. With my invention a great number of sheets conforming to the same curvature may be cut very rapidly, several at one time, so that the invention is particularly adapted for use in manufacturing a multiplicity of like articles.

In the drawings illustrating my invention in one form:

Fig. 1 is a side elevational view of a shear constructed in accordance with my invention.

Fig. 2 is a side elevational view of the structure shown in Fig. 1 viewed from the opposite side thereof.

Fig. 3 is a plan view of the shear showing the same operating upon a sheet mounted upon the pattern.

Fig. 4 is a rear end elevational view of the structure shown in Fig. 1.

Fig. 5 is a front end elevational view similar to Fig. 4.

Fig. 6 is a sectional view taken on line 6—6 of Fig. 2.

The invention proper consists primarily of a shear indicated in its entirety at A, which shear comprises a body portion 10 provided with an upper supporting member 11 and a lower supporting member 12. These members are spaced apart at the forward portion thereof to provide a transverse groove 13 extending completely across the same, and for a portion of the length thereof best shown in Figs. 1 and 2. The rearward portions of the supporting members 11 and 12 are connected together by means of a bridge 14 having offset portions 15 and 16 directly connected to said supporting members. All of this construction is formed integral and the parts are so arranged as to provide an upper recess 17 and a lower recess 18 which recesses extend in opposite directions and overlap one another terminating in curved walls 19 and 20. The two recesses 17 and 18 come together and communicate with the groove 13, the bridge member 14 terminating at this point as indicated at 21.

On opposite sides of the supporting members 11 and 12 are arranged sockets or depressions 22 and 23 which are situated one above the other and are arranged to receive a pair of co-operating complemental disk cutters 24 and 25. The supporting member 11 is formed with a bore 26 concentrically situated with respect to the socket 22 while the supporting member 12 is similarly formed with a bore 27 concentrically situated with respect to the socket 23. Within the bore 27 is pressed or otherwise securely held a concentric bushing 28 which forms a bearing for a trunnion 29 integrally connected to the cutter disk 24. In like manner an eccentric bushing 30 is mounted in the bore 26 which bushing forms a bearing for a trunnion 31 integrally formed on the cutter disk 25. The bushing 30, however, is adjustably positioned within the bore 26 and may be clamped in fixed position as follows: The forward portion of the supporting member 11 is slit as indicated at 33 up to the bore 26 dividing the forward portion of said supporting member into two halves 34 and 35. A machine screw 32 passes through a bore 36 in the upper half 34 and is seated against a shoulder 37 formed therein. This screw is further threaded into the lower half 35 of the upper supporting member 11 and serves to bring the two halves 34 and 35 together to securely clamp the bushing 30 in place within the bore 26. The two cutter disks 24 and 25 are held in position within the bushings 28 and 30 by means of two bolts 38 and 39 which pass directly through the trunnions 29 and 31, and which have shouldered against the heads thereof, washers 40 and 41 seated against the ends of said trunnions 29 and 31 and the ends of the bushings 28 and 30. These bolts are held in place by means of nuts 42 and 43 screwed upon the ends of the same.

In order to cause the cutters 24 and 25 to effectively shear the metal as the shear is moved along the same, these cutters are constructed and mounted in a certain manner, which is disclosed in Figs. 3 and 6. Both of the cutters 24 and 25 are identical in construction and are formed with a conical surface 44 intersecting a tapered surface 45. The conical surfaces 44 are only slightly conical so that the same are substantially planiform. The cutters are mounted so that the extreme peripheral portions of the conical surfaces 44 overlap each other as best indicated at Fig. 6 near the outer portions of the same. The elements of the two cutters at the point of contact are so arranged as to be in substantial vertical alignment bringing the axes of the cutters in inclined relation to the body 10 as clearly shown in Fig. 6. In addition the two axes of the cutters are disposed in intersecting vertical planes so that the point of contact of the two cutters lies along the intersection of the circles formed where the conical and tapered surfaces of the cutters meet, thus giving the shear point contact at the vertex of the angle formed between the cutting edges of the cutters. With this arrangement the most effective shearing action can be secured and at the same time the shear can be made to operate so as to cause the cutters to move toward one another when cutting is taking place, thereby taking the strain off from the bolts 38 and 39 and causing the cutting edges of the cutters to at all times come in proper contact. By recessing the surfaces 44 of the cutters as indicated at 46, to leave a marginal band, the portions thereof coming in contact is very small and at the same time wear on the cutters is distributed uniformly over this surface so that the cutters become automatically sharpened, and will continue in effective operating condition for an extended period of time.

The sheet metal or other stock to be sheared, which I have indicated in Fig. 1 at 47, is fed into the machine by inserting the same into the slot 13 where it engages between the cutting edges of the two cutters 24 and 25 and where the same is severed. The portions of the severed sheet are then naturally separated from one another through the action of the cutters, the upper portion 48 passing through the recess 17 and the lower portion 49 or the remainder of the sheet 47 passing through the recess 18. Due to the fact that the inner walls 19 and 20 of these recesses curve away from the plane of the cutters, the portions 48 and 49 of the sheet 47 may be cut in a curve having a radius not less than that of these curved walls. It will hence become readily understood that the shear may be moved in a curved path across the sheet to be cut and the severed portions thereof carried through the recesses 17 and 18 without interference.

In order to enable the user to duplicate cuts with my invention I employ in conjunction therewith a pattern which I have indicated at 50 in Fig. 3. This pattern is preferably constructed of a heavy grade of sheet metal and has an edge 51 thereof curved to conform to the curvature along which the shear is desired to cut. This edge is turned down as shown in Figs. 4 and 5 to provide a depending flange 52 also following the curvature of the edge 51. On the forward portion of the lower supporting member 12 is formed a boss 53 which is tapped to receive two parallel threaded spindles 54 and 55. The upper portions of these spindles are turned down to form trunnions 56 which are eccentrically disposed relative to said spindle. Upon these trunnions are journalled guide-rollers 57 and 58 which are arranged in spaced relation to one another, and which are adapted to engage upon the sides of the flange 52 of pattern 50 to guide the movement of the shear along said pattern. By rotating the spindles 54 and 55 the distance between the rollers 57 and 58 may be varied at will so as to compensate for wear, and to provide adjustment for different thicknesses of metal used in the formation of the patterns. When the device is used upon pipes or other curved surfaces the rollers 57 and 58 may be lowered or raised as the occasion requires by screwing the spindles 54 and 55 along the threads formed in the boss 53. To hold the spindles 54 and 55 from movement I employ two lock nuts 59 and 60 screwed upon the ends of said spindles and adapted to seat against the bottom of the boss 55.

In operating the device a handle 61 is employed which is provided with a bent shank 62 swivelly connected to a lug 63 formed on the forward portion of the upper supporting member 11. This handle may be swung into the position shown in full lines in Fig. 1, in which case the apparatus is arranged to be drawn across the pattern. If desired, the handle may be swung into the position shown in dotted lines in Fig. 1, in which case the shear may readily be pushed across the sheet to be sheared. This is accomplished by inclining the axis of the shank 62 relative to the body 10 of the shear so that the handle may take the two positions illustrated.

The use of the device is as follows: When it is desired to cut a number of sheets in accordance with a particular pattern, the pattern is rigidly secured to the bench or to a break or other suitable device with the flanged edge thereof protruding outwardly beyond the same. The sheet of metal to be cut is next placed flatly upon the pattern with the portion to be cut away, extending outwardly therefrom and said sheet is then clamped in place upon the pattern by any suitable means. I have found it quite convenient to attach the patterns to the side of a cornice break and to use the jaws of the same for clamping the sheet in place upon the pattern, such patterns being bent down and secured to the break by the ordinary clamp hooks furnished for that purpose. It will be comprehended, however, that any suitable clamping mechanism may be used so long as the sheet to be cut is held firmly in place upon the surface of the pattern. After the sheet has been properly positioned, the shear A is directed upon the end of the pattern and the flange 52 inserted between the rollers 57 and 58. By adjusting these rollers so that no play occurs the shear may be caused to accurately follow the formation of the curve of the edge 51 of said pattern. As soon as the cutters 24 and 25 approach the edge of the sheet to be cut the entire shear is moved inwardly so that said cutters contact with the sheet as close to the flange 52 as possible. By now simply drawing the handle 61 in the direction of the cut the shear A will follow the track or guideway formed by the flange 52 and cut the sheet 47 in place thereon to exactly conform to the curvature of the edge 51 of said pattern. The sheet may be quickly removed by opening the clamp and another sheet substituted in place thereof and the operation repeated. In ordinary use the corner formed by the body of the pattern 50 and the flange 52 thereof is sufficiently rounding to keep the upper surface of the roller 58 from contacting with the pattern through its entire extent. For this reason the roller travels freely along the guideway, offering practically no resistance to the movement of the shear.

The shear may be used with straight patterns as well as curved patterns and in such cases the device is highly applicable for use in cutting along sheets of material where it would require a large expensive shear to perform the operation, or would necessitate the cutting of the same with hand snips.

Although I have described my invention as being applicable to cut along plane surfaces, yet the same can be readily used to cut sheets whose surfaces are curved such as pipes, domes, cones, etc. This is made possible by causing the recess 18 to diverge, as shown in Fig. 2, its lowermost wall 64 being curved as shown. When the shear is so used the pattern whose surface must necessarily conform to the surface of the sheet to be cut will follow more closely to the wall 64 of recess 18 and to permit of using the shear on a pattern with a minimum radius of curvature, a groove 65 is formed in the walls 64 of the lower supporting member 12, which is adapted to receive the flange of the pattern when the device is moved along the same. This groove, as shown in Fig. 4, must necessarily flare outwardly to permit the shear to follow along the desired curves. By constructing a cylindrical pattern and expanding the same within a formed sheet metal pipe, the shear may be used to cut the pipe after formation in such a manner as to permit of attaching or forming in conjunction with the same an elbow or other desirable connection.

My invention is highly meritorius in that it provides a simple and inexpensive shear to perform the functions of a large bulky machine and which in addition will cut curves of different curvature not heretofore possible with any simple device. The patterns for use in conjunction with my improved shear may readily be constructed in the ordinary tin shop from sheet metal readily available, and may be constructed at small cost and when once produced will continue to operate indefinitely to enable the operator to readily and effectively cut sheets of metal in conformity with the curvature of the pattern. The device will function upon curved as well as plane surfaces and will readily operate to cut any curve of any formation, the radius of which at any point is not less than the minimum radius for which the shear is designed. By mounting the rollers and constructing the same as illustrated, the shear will effectively operate to shear the metal with a clean, smooth cut, and due to the construction of the cutters will automatically sharpen the same as said cutters wear so that the device is therefore rendered effective for the purpose desired for an indefinite period of time.

Changes in the specific form of my invention, as herein disclosed, may be made within the scope of what is claimed without departing from the spirit of my invention.

Having described my invention, what I claim as new and desire to protect by Letters Patent is:

1. In combination with a pattern having a flanged edge, a body member having a transverse groove extending across the same adapted to receive said pattern and a sheet attached thereto, oppositely facing recesses formed in said body and communicating with said groove, a pair of complemental circular cutters journalled in said body having their co-operating edges disposed within said groove and adapted to shear the sheet mounted upon said pattern, the severed portions of the sheet being adapted to pass into said recesses and to become spaced from one another to permit the shear to follow said flange, and a guide formed on said body co-operating with said flange for causing the shear to follow the same and cut the sheet in accordance with the curvature of the flanged edge of said pattern.

2. A shear comprising a body, a pair of circular disk cutters, each having a conical surface and a tapered surface intersecting each other along a circle, said disks being angularly journalled in said body to bring the conical surfaces in peripheral contact and with an element of each in substantial alignment, the axes of said cutters being disposed in intersecting planes to bring the point of contact of said cutters at the intersection of the circles formed at the meeting of the surfaces of said cutters.

3. A shear comprising a body, a pair of circular disk cutters, each having a conical surface and a tapered surface intersecting each other along a circle, said disks being angularly journalled in said body to bring the conical surfaces in peripheral contact and in alignment with one another, the axes of said cutters being disposed in intersecting planes to bring the point of contact of said cutters at the intersection of the circles formed at the meeting of the surfaces of said cutters, said cutters being recessed along the conical surfaces thereof except for a peripheral band situated adjacent the tapered surfaces thereof.

4. A shear for use in conjunction with a pattern having a flanged edge comprising a body member having a pair of cooperating circular cutters journalled therein, a boss formed on said body, a pair of spaced threaded spindles screwed into said boss, eccentrically disposed trunnions formed on the ends of said spindles, guide rollers journalled upon said trunnions and means for holding said spindles in fixed relation to said boss.

5. A shear for use in conjunction with a pattern having a flanged edge comprising a body member having a pair of co-operating circular cutters journalled therein, a boss formed on said body, a pair of spaced threaded spindles screwed into said boss, eccentrically disposed trunnions formed on the ends of said spindles, guide rollers journalled upon said trunnions, and lock nuts screwed upon the ends of said spindle for holding said guide rollers in fixed relation to one another.

6. A shear comprising a body portion, a pair of co-operating disk cutters journalled for rotation therein adapted to cut a sheet of metal, a handle having an angularly disposed shank, pivoted to said body in angular relation to the plane of the sheet cut, said handle being adapted to be swung forwardly of said body portion in inclined relation to said sheet, or to be swung over and above said body portion substantially parallel to it.

7. A shear comprising a body member formed with upper and lower portions, said portions being provided with spaced transverse bores extending through the same, said body member having two sockets concentrically formed relative to said bores, said sockets being disposed on opposite sides of said body member and extending inwardly past one another, rotatable members journaled in said bores and cutters mounted upon the ends of said rotatable members, said cutters being disposed within said sockets and being adapted to coact with one another to shear a sheet passed therebetween.

8. A shear comprising a body member having a cutter journaled therein and being formed with a bore spaced from the axis of said cutter, an eccentric bushing mounted in said bore, a complemental cutter journaled in said bushing, said bushing being revoluble within said bore to move the cutting edges of said cutter relative to one another in a radial direction and being further movable longitudinally along said bore to move the cutting edges of said cutter in a longitudinal direction relative to one another, and means for clamping said bushing in adjusted position within said wall.

9. A shear comprising a body member having a cutter journaled therein and being formed with a bore spaced from the axis of said cutter, an eccentric bushing mounted in said bore, a complemental cutter journaled in said bushing, said bushing being revoluble within said bore to move the cutting edges of said cutter relative to one another in a radial direction and being further movable longitudinally along said bore to move the cutting edges of said cutter in a longitudinal direction relative to one another, said body portion being formed with a slit extending up to said bore and a screw passing through said body member for drawing the slit portions thereof together to clamp said bushing within said bore.

10. In combination with a pattern having a flanged edge, a shear comprising a body member, a pair of complemental circular cutters journaled in said body member and adapted to cut a sheet attached to said pattern, and a guide attached to said body member adapted to follow the flange of said pattern, said guide being disposed substantially in the common plane of said cutters and in close proximity to the sheet cut.

11. In combination with a pattern having a flanged edge, a shear comprising a body member, a pair of complemental circular cutters journaled in said body member and adapted to cut a sheet attached to said pattern, and a guide attached to said body member adapted to follow the flange of said pattern, said guide being disposed substantially in the common plane of said cutters and in close proximity to the sheet cut, said pattern being adapted to pass through said body member with the flange thereof disposed at the periphery of one cutter and to the side of the other cutter to bring the guiding edge thereof in substantial alignment with the line of shear of said cutters.

12. A shear for use in conjunction with a pattern having a flanged edge comprising a body portion including an upper and a lower supporting member arranged to provide a transversely formed groove extending for a portion of the length thereof, a bridge having offset portions connecting said upper and lower supporting members forming in conjunction with said supporting members a pair of oppositely facing recesses communicating with said groove, a pair of co-operative circular cutters mounted for rotation in said supporting members and having their co-operative edges situated within said groove near the end thereof, said groove being of a width sufficient to freely receive the flanged pattern with the sheet to be cut mounted thereon, guides formed on said body portion substantially in the line of shear of said cutters and being adapted to co-operate with said flange, said body portion being formed with a groove adapted to freely receive the flange of said pattern during the passage of the same through the shear.

13. A shear for use in conjunction with a pattern having a flanged edge comprising a body portion including an upper and a lower supporting member arranged to provide a transversely formed groove extending for a portion of the length thereof, a bridge having offset portions connecting said upper and lower supporting members forming in conjunction with said supporting members, a pair of oppositely facing recesses communicating with said groove, a pair of co-operative circular cutters mounted for rotation in said supporting members and having their co-opertive edges situated within said groove near the end thereof, said groove being of a width sufficient to freely receive the flanged pattern with the sheet to be cut mounted thereon, guides formed on said body portion substantially in the line of shear of said cutters and being adapted to co-operate with said flange, said body portion being formed with a groove adapted to freely receive the flange of said pattern during the passage of the same through the shear, said groove gradually widening to permit of the shear swinging to follow the curve of the flange.

14. A shear comprising a body portion including an upper and lower supporting member, a bridge member connecting said upper and lower supporting members, circular cutters journaled in said upper and lower supporting members, the lower portion of said upper supporting member extending outwardly beyond the surface thereof to form an attaching lug and a handle pivoted to said attaching lug adapted to swing over and above said upper supporting member outwardly therefrom, said handle conforming in configuration to the shape of said upper supporting member so as to lie in close proximity thereto when in position above the same or to be swung outwardly therefrom in operating position.

In testimony whereof, I have signed my name to this specification.

EMIL J. TJERNLUND.